United States Patent [19]

Demura et al.

[11] Patent Number: 4,786,145
[45] Date of Patent: Nov. 22, 1988

[54] LIQUID CRYSTAL ANTIDAZZLE MIRROR

[75] Inventors: Hiroshi Demura, Toyota, Japan; Akira Kawahashi, Stanford, Calif.; Yasuo Ohyama, Toyota, Japan; Sadao Kokubu, Aichi, Japan; Kouji Takizawa, Aichi, Japan; Shigeru Iguchi, Aichi, Japan

[73] Assignees: Toyota Jidosha Kabushiki Kaisha; Kabushiki Kaisha Tokai Tika Denki Seisakusho, both of Aichi, Japan

[21] Appl. No.: 876,922

[22] Filed: Jun. 20, 1986

[30] Foreign Application Priority Data

Jun. 21, 1985 [JP] Japan .............................. 60-94202[U]

[51] Int. Cl.⁴ .......................... G02F 1/13; G02B 17/00
[52] U.S. Cl. ................................. 350/331 R; 350/338; 350/332; 350/342; 350/278; 350/279; 350/283; 350/276 R
[58] Field of Search .................. 350/331 R, 338, 342, 350/278, 279, 283, 332, 276 R

[56] References Cited

U.S. PATENT DOCUMENTS

| 4,669,827 | 6/1987 | Fukada et al. | 350/283 |
| 4,671,615 | 6/1987 | Fukada et al. | 350/279 |
| 4,676,601 | 6/1987 | Itoh et al. | 350/331 R |

FOREIGN PATENT DOCUMENTS 0149481  7/1985  European Pat. Off. ............ 350/278

Primary Examiner—Stanley D. Miller
Assistant Examiner—Trong Quang Phan
Attorney, Agent, or Firm—Kenyon & Kenyon

[57] ABSTRACT

A liquid crystal antidazzle mirror for supplying a power to liquid crystal drive control circuit when a key plate is inserted into a key cylinder which comprises a key position detecting switch for detecting that the key plate is inserted into the key cylinder, and an initializing circuit for initializing the liquid crystal drive control circuit to either special mode of predetermined antidazzle or dazzle state upon receiving a detection signal of the key position detecting switch. Thus, the antidazzle mirror can automatically initialize the antidazzle mirror to either special mode of a predetermined antidazzle and dazzle states when power is supplied from a battery.

4 Claims, 2 Drawing Sheets

LIQUID CRYSTAL ANTIDAZZLE MIRROR

BACKGROUND OF THE INVENTION

This invention relates to a liquid crystal antidazzle mirror used for a vehicle.

A liquid crystal antidazzle mirror which utilizes a liquid crystal is used as one type of an antidazzle mirror in an automobile. This liquid crystal antidazzle mirror alters the light transmission factor of the liquid crystal by controlling a voltage applied to the liquid crystal disposed in front of a mirror to control the reflectivity of the mirror, thereby performing the antidazzle action.

This liquid crystal antidazzle mirror described above necessitates a power source for controlling the light transmission of the liquid crystal. An automotive battery is generally used as this power source for the antidazzle mirror, but it is desirable to supply electric power from the battery when the antidazzle mirror used so as to protect the battery against its discharge since the capacity of the battery is limited. The inventor of this invention has proposed a prior liquid crystal antidazzle mirror which has solved the problem of a decrease in the capacity of the automotive battery as disclosed in Japanese Utility Model Application No. 169708/84. This liquid crystal antidazzle mirror is constructed, as shown in FIG. 3, of a liquid crystal drive control circuit 32 for controlling a voltage applied to a liquid crystal 31, and a key position detecting switch 34 connected between the control circuit 32 and a battery 33 for closing a contact by detecting the fact that a key plate is plugged in a key cylinder when the key plate is inserted into the cylinder to supply power from the battery to the control circuit 32 only when the key plate is plugged in the key cylinder. This antidazzle mirror does not supply power from the battery to the mirror when the key plate is revolved such as to a park position, thereby-eliminating problems of a decrease in the charge of the battery or corrosion.

The abovementioned prior liquid crystal antidazzle mirror is effective in energy saving since supplying power from the battery only when the key plate is plugged in a key cylinder. However, when power is supplied from the battery to the antidazzle mirror, it is not apparent whether the antidazzle mirror is disposed in antidazzle or dazzle state and necessary to confirm whether the mirror is disposed in the antidazzle or dazzle state by switching its mode by operating a mode change switch when confirming the rear visual field through the antidazzle mirror immediately after the power is supplied from the battery to the antidazzle mirror, thereby being insufficient at the point of operability.

SUMMARY OF THE INVENTION

It is, accordingly, an object of this invention to provide a liquid crystal antidazzle mirror which can eliminate the aforementioned drawbacks and can automatically initialize the antidazzle mirror to either special mode of a predetermined antidazzle and dazzle states when power is supplied from a battery.

In order to achieve the above and other objects, there is provided a liquid crystal antidazzle mirror for supplying power to a liquid crystal drive control circuit when a key plate is inserted into a key cylinder comprising a key position detecting switch for detecting that the key plate is inserted into the key cylinder, and an initializing circuit for initializing the liquid crystal drive control circuit to either special mode of predetermined antidazzle or dazzle state upon receiving of a detection signal of the key position detecting switch.

When the key plate is plugged in the key cylinder, the key position detecting switch detects it, and applies a detection signal to the initializing circuit. When the initializing circuit receives the detection signal from the detecting switch, the initializing circuit outputs a mode designation signal for designating either special set mode of the predetermined antidazzle and dazzle states to the control circuit. The control circuit applies a voltage to a liquid crystal in response to the mode designation signal, thereby altering the light transmission factor of the liquid crystal to positively initialize the liquid crystal antidazzle mirror to the predetermined antidazzle or dazzle state. Accordingly, according to this invention, when the key plate is plugged in the key cylinder and power is supplied from the battery to the power source, it initializes simultaneously to a predetermined antidazzle or dazzle state, thereby eliminating the ambiguous state of the conventional liquid crystal antidazzle mirror.

After the antidazzle is initialized, a mode change switch can freely switch the antidazzle or dazzle state by operating the switch.

BRIEF DESCRIPTION OF THE DRAWINGS

The above and other related objects and features of the invention will be apparent from a reading of the following description of the disclosure found in the accompanying drawings and novelty thereof pointed out in the appended claim.

DESCRIPTION OF THE PREFERRED EMBODIMENTS

This invention will now be described in detail with reference to FIGS. 1 and 2, which show an embodiment of the liquid crystal antidazzle mirror according to this invention.

Figure 1:
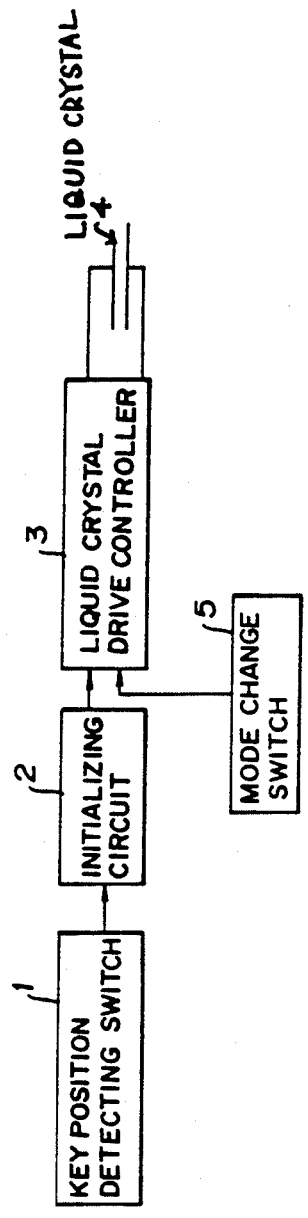
FIG. 1 is a block diagram showing the construction of an embodiment of a liquid crystal antidazzle mirror according to the present invention.

FIG. 1 is a block diagram showing an embodiment of a liquid crystal antidazzle mirror according to the present invention. A liquid crystal antidazzle mirror for supplying power to a liquid crystal drive control circuit 3 when a key plate is inserted into a key cylinder comprises a key position detecting switch 1 for detecting that the key plate is inserted into the key cylinder, and an initializing circuit 2 for initializing the liquid crystal drive control circuit 3 to either special mode of predetermined antidazzle or dazzle state upon receiving a detection signal of the key position detecting switch 3.

When the key plate is pluggedin the key cylinder, the key position detecting switch 1 detects it, and applies a detection signal to the initializing circuit 2. When the initializing circuit 2 receives the detection signal from the detecting switch 1, the initializing circuit 2 outputs a mode designation signal for designating either special set mode of the predetermined antidazzle or dazzle states to the control circuit 3. The control circuit 3 controls to apply a voltage to a liquid crystal 4 in response to the mode designation signal, thereby altering the light transmission factor of the liquid crystal 4 to positively initialize the liquid crystal antidazzle mirror to the predetermined antidazzle or dazzle state. Accordingly, according to this invention, when the key plate is plugged in the key cylinder and power is supplied from the battery to the power source, it initializes simultaneously to a predetermined antidazzle or dazzle state, thereby eliminating the ambiguous state of the conventional liquid crystal antidazzle mirror.

After the antidazzle is initialized, a mode change switch 5 can freely switch the antidazzle or dazzle state by operating the switch 5.

Figure 2:
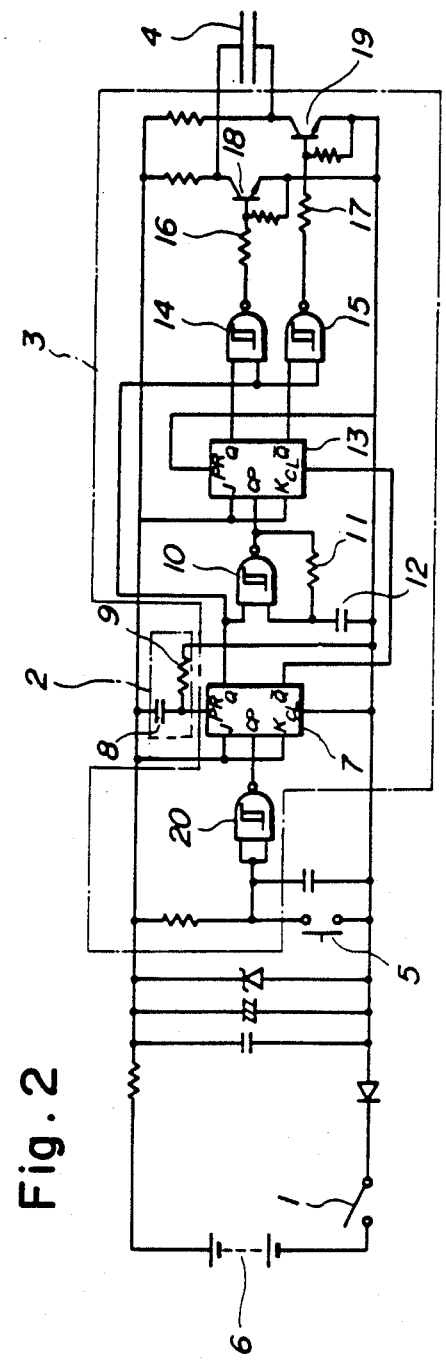
FIG. 2 is an electric circuit diagram showing an embodiment of the invention.
Figure 3:
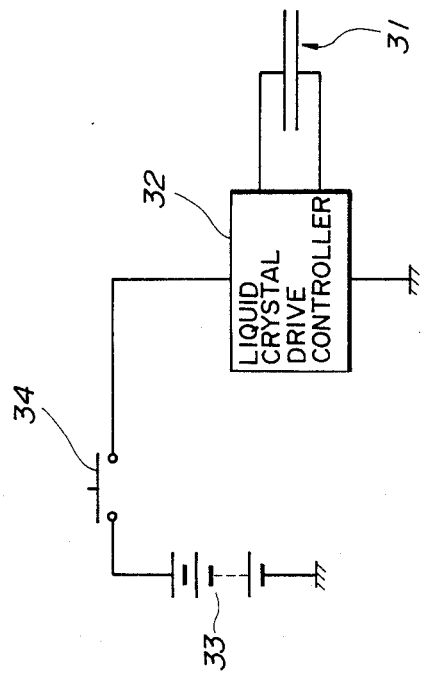
FIG. 3 is a block circuit diagram showing the construction of the conventional antidazzle mirror.

FIG. 2 shows an embodiment of an antidazzle mirror which is initialized to the dazzle state. The liquid crystal drive control circuit 3 is constructed to supply electric power from a battery 6 when the key position detecting switch 1 is closed. The detecting switch 1 is, for example, a switch associated integrally with the key cylinder to close its contact when the key plate is inserted into or plugged in the key cylinder. The initializing circuit 2 has, in the exemplified example in FIG. 2, a preset capacitor 8, and a preset resistor 9. When the switch 1 is closed to supply power from the battery 6, a charging current flows through the present capacitor 8 to the preset resistor 9. Thus, a signal "1" is applied to the preset terminal PR of the flip-flop 7, thereby setting the flip-flop 7 at its terminal Q to "1" and at its terminal $\overline{Q}$ to "0".

When the flip-flop 7 is set at its terminal Q to "1" and at its terminal $\overline{Q}$ to "0" as described above, the signal "1" from the terminal Q is input to one gate of a Schmitt oscillator circuit 10, which starts oscillating at a frequency determined by a resistor 11 and a capacitor 12 and generates a rectangular wave output. Simultaneously the signal "0" from the terminal $\overline{Q}$ is input to the clear terminal CL of the flip-flop 13 for dividing the frequency and shaping the waveform, to set the flip-flop 13 to a countable state. Therefore, the flip-flop 13 divides by ½ the rectangular wave oscillation output inputted from the Schmitt circuit 10 and outputs rectangular waves of reverse phase from the output terminals Q and $\overline{Q}$, respectively. The rectangular wave outputs are respectively input to one gate of each of waveform inverting Schmitt circuits 14, 15, and the signal "1" from the output terminal Q of the flip-flop 7 is applied to the other gate of each of the Schmitt circuits 14, 15. Thus, the Schmitt circuits 14, 15 invert the rectangular waves input from the flip-flop 13, and output through bias resistors 16, 17 to the baes of output transistors 18, 19. As a result, output transistors 18, 19 are turned ON and OFF in reverse phase to one another to apply reverse phase voltages to between the electrodes of the liquid crystal 4, with the result that the voltage is applied to the liquid crystal 4. Accordingly, the liquid crystal 4 is initialized to the dazzle state having high light transmission factor. In this manner, the liquid crystal antidazzle mirror exemplified in the drawings is initialized to the dazzle state simultaneously when the power is supplied from the battery to the antidazzle mirror.

In case that the antidazzle mirror is switched from the dazzle state to the antidazzle state after being initialized, a mode change switch 5 is depressed to apply an earth potential to the Schmitt circuit 20. Thus, the Schmitt circuit 20 for shaping and inverting the waveform generates a signal "1" to the clock pulse terminal CP of the flip-flop 7 to invert the set state of the flip-flop 7 at its terminal Q to "0" and at its terminal $\overline{Q}$ to "1". Therefore, when the flip-flop 7 is set at its terminal Q to "0", the Schmitt circuit 10 stops oscillating. Further, since the Schmitt circuits 14, 15 are also fixed to high potential state of the output "1", output transistors 18, 19 are all turned ON, no voltage is to thus applied to between the terminals of the liquid crystal 4, and the liquid crystal 4 is switched to the antidazzle state having small light transmission factor.

In the embodiment described above, the case that the antidazzle mirror is initialized to the dazzle state when power is supplied from the battery has been described. The present invention is not limited to the particular embodiment. For example, contrary thereto, if the antidazzle mirror is constructedto initialize itself to the antidazzle state when the power is supplied from the battery, the preset capacitor 8 and the preset resistor 9 in FIG. 2 are connected to the clear terminal CL side of the flip-flop 7, and the preset terminal PR may be connected to the earth or ground potential. Thus, the flip-flop 7 is simultaneously set at its terminal Q to "0" and at its terminal $\overline{Q}$ to "1", the opposite of the case described above if the power is supplied reversely, and the liquid crystal 4 is initialized to the antidazzle state in which a voltage is not applied.

According to the present invention as described above, when the key plate is inserted into the key cylinder and power is supplied from the battery, the liquid crystal antidazzle mirror can be automatically initialized to the special mode of the predetermined antidazzle or dazzle state, thereby eliminating the ambiguity of the conventional liquid crystal antidazzle mirror to the set state of antidazzle and dazzle states so as to obviate the complexity of having to actuate the changeover switch to determine the state of the mirror.

According to the invention, in case that the initialize mode by the initializing circuit is set to the dazzle state, when the key plate is inserted into the key cylinder and power is supplied from the battery, the antidazzle mirror is automatically set to the dazzle state preferred for rear visibility. Thus, the invention can provide such advantage that the maximum rear visibility becomes effective when the vehicle starts immediately after the key plate is inserted, thereby improving the safety of the vehicle driving.

What is claimed:

1. A liquid crystal antidazzle mirror having a key position detecting switch for supplying power to a liquid crystal drive control circuit when a key plate is inserted into the key cylinder, the mirror comprising:
   an initializing circuit having a preset capacitor and a preset resistor connected between the key position detecting switch and the liquid crystal drive control circuit for initializing the liquid crystal drive control circuit to a preselected one of predetermined antidazzle and dazzle states upon receiving a detection signal of the key position detection switch.

2. The liquid crystal antidazzle mirror according to claim 1, wherein said preselected one of the predetermined antidazzle and dazzle states is the dazzle state.

3. The liquid crystal antidazzle mirror according to claim 1, wherein said preselected one of the predetermined antidazzle and dazzle states is the antidazzle state.

4. The liquid crystal antidazzle mirror according to claim 1, wherein said key position detecting switch is associated integrally with the key cylinder.

* * * * *

UNITED STATES PATENT AND TRADEMARK OFFICE
CERTIFICATE OF CORRECTION

PATENT NO. : 4,786,145

DATED : 22 November 1988

INVENTOR(S) : Hiroshi DEMURA et al.

It is certified that error appears in the above-identified patent and that said Letters Patent is hereby corrected as shown below:

On the cover page: Change the second assignee's name from "KABUSHIKI KAISHA TOKAI TIKA DENKI SEISAKUSHO" to --KABUSHIKI KAISHA TOKAI RIKA DENKI SEISAKUSHO--.

Signed and Sealed this

Nineteenth Day of June, 1990

*Attest:*

HARRY F. MANBECK, JR.

*Attesting Officer*     *Commissioner of Patents and Trademarks*